US012795031B2

(12) United States Patent
Sevier

(10) Patent No.: US 12,795,031 B2
(45) **Date of Patent: *Nov. 10, 2026**

(54) TRUSTED MEDIA DEVICE AND PROCESS FOR AUTHENTICATION OF DIGITAL MEDIA

(71) Applicant: Atom Technologies LLC, Dover, DE (US)

(72) Inventor: Stuart Sevier, Dover, DE (US)

(73) Assignee: Atom Technologies LLC, Dover, DE (US)

( * ) Notice: Subject to any disclaimer, the term of this patent is extended or adjusted under 35 U.S.C. 154(b) by 65 days.

This patent is subject to a terminal disclaimer.

(21) Appl. No.: 18/914,602

(22) Filed: Oct. 14, 2024

(65) Prior Publication Data

US 2025/0330546 A1 Oct. 23, 2025

Related U.S. Application Data

(63) Continuation of application No. 18/643,823, filed on Apr. 23, 2024, now Pat. No. 12,120,282.

(51) Int. Cl.

| | |
|---|---|
| ***H04N 1/32*** | (2006.01) |
| ***G06F 21/44*** | (2013.01) |
| ***G06T 7/80*** | (2017.01) |
| ***G06V 20/00*** | (2022.01) |
| ***H04N 23/51*** | (2023.01) |

(52) U.S. Cl.

CPC ......... *H04N 1/32283* (2013.01); *G06F 21/44* (2013.01); *G06T 7/80* (2017.01); *H04N 23/51* (2023.01); *H04N 2201/3235* (2013.01)

(58) Field of Classification Search

CPC ............... H04N 1/32283; H04N 23/51; H04N 2201/3235; G06F 21/44; G06T 7/80; G06V 10/751; G06V 20/95

See application file for complete search history.

(56) References Cited

U.S. PATENT DOCUMENTS 5,499,294 A * 3/1996 Friedman ............... H04N 23/60 380/246
7,787,030 B2 8/2010 Fridrich et al.
(Continued)

FOREIGN PATENT DOCUMENTS

| | | | |
|---|---|---|---|
| EP | 4305803 | A1 | 1/2024 |
| WO | 2015145091 | A1 | 10/2015 |

OTHER PUBLICATIONS

Coalition for Content Provenance and Authenticity; "C2PA Explainer" 1.0, Sep. 1, 2022: Release, available as of Apr. 23, 2024 at: https://c2pa.org/specifications/specifications/1.2/explainer/Explainer.html; pp. 1-12.

(Continued)

*Primary Examiner* — Ahmed A Berhan
(74) *Attorney, Agent, or Firm* — Bracewell LLP

(57) ABSTRACT

A trusted media device for use with a digital camera to create trusted media files that provide assurance that the media file captures a real-world scene and is not synthetic (for example, AI-generated) media. The trusted media device includes a digital camera and provides for generation of a trusted media file after authentication of fingerprints associated with the digital camera and the trusted media device and authentication of perceptual hashes for captured images. Embodiments of the disclosure further include processes for pairing the trusted media device and viewing and editing the trusted media file.

19 Claims, 5 Drawing Sheets

(56) References Cited

U.S. PATENT DOCUMENTS

| | | | | |
|---|---|---|---|---|
| 8,160,293 | B1 | 4/2012 | Fridrich et al. | |
| 8,447,989 | B2 * | 5/2013 | Barrus | H04L 9/3242 713/181 |
| 8,855,358 | B2 | 10/2014 | Fridrich et al. | |
| 2002/0093583 | A1 * | 7/2002 | Ito | H04N 23/632 348/E5.042 |
| 2017/0169293 | A1 | 6/2017 | Valsesia et al. | |

OTHER PUBLICATIONS

Content Authenticity Initiative; "Open-source tools for content authenticity and provenance" available as of Apr. 23, 2024 at: https://opensource.contentauthenticity.org/; pp. 1-5.
Debiasi, Luca; "Exploiting Image Sensor Data in Biometric Systems and Mobile Applications" dissertation submitted to the Faculty of Natural Sciences, University of Salzburg, Mar. 2020; pp. 1-168.
Fridrich, Jessica; "Sensor Defects in Digital Image Forensic" Digital Image Forensics: There is More to a Picture than Meets the Eye; DOI: 10.1007/978-1-4614-0757-7_6; pp. 1-43.
Lefebvre, Frederic et al.; "Image and Video Fingerprinting: Forensic Applications" Proceedings of SPIE—The International Society for Optical Engineering (2009); pp. 1-9.
Stamm, Matthew C. et al.; "Information Forensics: An Overview of the First Decade" IEEE Access, vol. 1, 2013; pp. 167-200.
Zheng, Yue et al.; "A PUF-based Data-Device Hash for Tampered Image Detection and Source Camera Identification" IEEE Transactions on Information Forensics & Security, accepted Jun. 28, 2019; pp. 1-15.

* cited by examiner

TRUSTED MEDIA DEVICE AND PROCESS FOR AUTHENTICATION OF DIGITAL MEDIA

CROSS-REFERENCE TO RELATED APPLICATIONS

This application is a continuation of and claims priority from U.S. Non-provisional application Ser. No. 18/643,823 filed Apr. 23, 2024, and titled "TRUSTED MEDIA DEVICE AND PROCESS FOR AUTHENTICATION OF DIGITAL MEDIA," a copy of which is incorporated by reference in its entirety for purposes of United States patent practice.

BACKGROUND

Field of the Disclosure

The present disclosure generally relates to digital cameras and digital media. More specifically, embodiments of the disclosure relate to the authentication of digital media captured by digital cameras.

Description of the Related Art

Digital cameras are used to capture digital media, such as digital images (also referred as photographs), using various types of image sensors, such as a charge-coupled device (CCD) or a complementary metal oxide semiconductor (CMOS) sensor. Captured digital media may undergo a wide range of post-processing, which may be performed on the digital camera or on a computing device that obtains a copy of the digital media from the digital camera. The use of generative artificial intelligence ("generative AI" or "GAI") may also be used to generate or alter digital media. In some instances, generative AI may be used to generate digital images of allegedly real-world objects, places, or people in combination with or without the use of a digital camera. Distinguishing between digital media captured using digital cameras and digital media created or altered by generative AI may be difficult and result in confusion and untrustworthiness by publishers and viewers.

SUMMARY

Authenticating the origins of media (such as digital images, audio, and video) captured by digital cameras, audio recorders, and video cameras, is difficult in view of current and developing AI technology. Additionally, determining how much the media reflects the reality of a captured scene is a related but more challenging problem. Many techniques rely on detecting AI edited or generated media (also referred to as "synthetic" media) after it is produced. These techniques fail as AI technology improves, resulting in an "arms-race" scenario between producers of synthetic media and those the detection and labeling of such media. Some efforts, such as the Coalition for Content Provenance and Authenticity (C2PA), rely on unique author credentials to bind provenance data together with media. However, C2PA and similar approaches lack a reality-based root of trust that independently authenticates media.

In one embodiment, a trusted media device for a digital camera is provided. The trusted media device includes a housing, such that the housing includes a portion configured to insert into a corresponding receptable of the digital camera, a processor, an image sensor accessible by the processor, and a hardware security module accessible by the processor. The trusted media device also includes computer-readable media accessible by the processor and having executable code stored thereon, the executable code includes a set of instructions that causes the processor to generate a trusted image file based on a digital image captured by the digital camera. In some embodiments, the set of instructions cause the processor to perform operations that include obtaining the digital image from the digital camera, the digital image stored as an image file includes the digital image and metadata, obtaining a second image from the trusted media device, computing a data hash of the second image, determining a first fingerprint from the digital image, determining a second fingerprint from the second image, and conducting a fingerprint authentication. Conducting the fingerprint authentication includes determining that the first fingerprint matches a stored fingerprint associated with the digital camera and determining that the second fingerprint matches a stored fingerprint associated with the trusted media device. The operations also include computing, in response to the fingerprint authentication, a first perceptual hash of the digital image and computing, in response to the fingerprint authentication, a second perceptual hash of the second image. The operations further include determining that the first perceptual hash matches the second perceptual hash and creating, in response to determining that the first perceptual hash matches the second perceptual hash, the trusted image file, the trusted image file includes the digital image, the metadata, the data hash, the second perceptual hash, and a signature. In some embodiments, the digital image is stored in RAW image format. In some embodiments, the data hash uses a SHA256 hash. In some embodiments, the first perceptual hash and the second perceptual hash each use scale-invariant feature transform (SIFT). In some embodiments, the stored fingerprint associated with the digital camera includes a Photo Response Non-Uniformity (PRNU) fingerprint associated with an image sensor of the digital camera. In some embodiments, the stored fingerprint associated with the trusted media device includes a Photo Response Non-Uniformity (PRNU) fingerprint associated with the image sensor of the trusted media device. In some embodiments, the trusted media device includes a universal serial bus (USB) connector. In some embodiments, the trusted media device includes a battery.

In another embodiment, a method for created a trusted image file using a trusted media device for a digital camera is provided. The method includes obtaining a first image from the digital camera, the first image stored as an image file includes the first image and metadata, obtaining a second image from the trusted media device, computing a data hash of the second image, determining a first fingerprint from the digital image, determining a second fingerprint from the second image, and conducting a fingerprint authentication. Conducting the fingerprint authentication includes determining that the first fingerprint matches a stored fingerprint associated with the digital camera and determining that the second fingerprint matches a stored fingerprint associated with the trusted media device. The method also includes computing, in response to the fingerprint authentication, a first perceptual hash of the digital image and computing, in response to the fingerprint authentication, a second perceptual hash of the second image. The method further includes determining that the first perceptual hash matches the second perceptual hash and creating, in response to determining that the first perceptual hash matches the second perceptual hash, the trusted image file, the trusted image file that includes the digital image, the metadata, the data hash, the second perceptual hash, and a signature. In some embodiments, the method includes recomputing, in response determining that the first perceptual hash matches the second perceptual hash, the data hash of the second image. In some embodiments, the method includes deleting the second image after creation of the trusted image file. In some embodiments, the digital image is stored in RAW image format. In some embodiments, the data hash uses a SHA256 hash. In some embodiments, the first perceptual hash and the second perceptual hash each use scale-invariant feature transform (SIFT). In some embodiments, the stored fingerprint associated with the digital camera includes a Photo Response Non-Uniformity (PRNU) fingerprint associated with an image sensor of the digital camera. In some embodiments, the stored fingerprint associated with the trusted media device includes a Photo Response Non-Uniformity (PRNU) fingerprint associated with an image sensor of the trusted media device.

In another embodiment, a method for pairing a trusted media device with a digital camera is provided. The method includes obtaining a first flat field calibration image from the digital camera, obtaining a second flat field calibration image from the trusted media device, determining a first fingerprint using the first flat field calibration image, and determining a second fingerprint using the second flat field calibration image. The method also includes obtaining a third calibration image from the digital camera, obtaining a fourth calibration image from the trusted media device, validating the first fingerprint with the second fingerprint using the third calibration image and the fourth calibration image, and pairing the trusted media device with the digital camera. In some embodiments, the stored fingerprint associated with the digital camera includes a Photo Response Non-Uniformity (PRNU) fingerprint associated with an image sensor of the digital camera. In some embodiments, the stored fingerprint associated with the trusted media device includes a Photo Response Non-Uniformity (PRNU) fingerprint associated with an image sensor of the trusted media device.

DETAILED DESCRIPTION

The present disclosure will be described more fully with reference to the accompanying drawings, which illustrate embodiments of the disclosure. This disclosure may, however, be embodied in many different forms and should not be construed as limited to the illustrated embodiments. Rather, these embodiments are provided so that this disclosure will be thorough and complete, and will fully convey the scope of the disclosure to those skilled in the art.

Embodiments of the disclosure include a trusted media device for use with a digital camera to create trusted media files that provide assurance that the media file captures a real-world scene and is not synthetic (for example, AI-generated) media. Embodiments of the disclosure further include processes for pairing the trusted media device, generating a trusted media file using the trusted media device, and viewing and editing the trusted media file.

Figure 1:
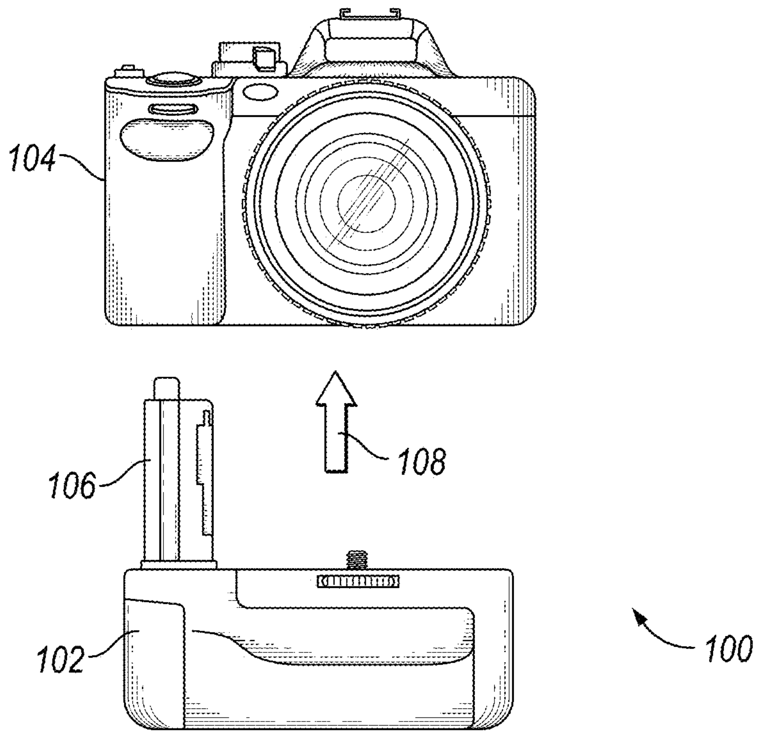
FIG. 1 is a schematic diagram of a trusted media device for attachment to a digital camera in accordance with an embodiment of the disclosure.

FIG. 1 is a schematic view of a trusted media device 100 for a digital camera 104 in accordance with an embodiment of the disclosure. The trusted media device 100 may have a housing 102 that generally encloses the components of the device 100 and includes connectors (e.g., electrical connectors, mechanical connectors, or both) for attachment to a digital camera 104. The housing 102 may generally be formed from a plastic or a metallic alloy, with external electrical connectors, mechanical connectors, or both.

The trusted media device 100 may have a form factor that conforms to the housing of a digital camera such that the trusted media device 100 easily attaches to the digital camera. For example, the trusted media device 100 may have a form factor similar to a "battery grip" used with a digital camera, such that the device 100 includes a protrusion 106 for being received by a similarly shaped receptacle in the digital camera 104. In some embodiments, the housing 102 may include one or more contoured portions to provide grip functionality when the trusted media device 100 is attached to a digital camera. In some embodiments, different housings may be used to accommodate different digital cameras. In some embodiments, the trusted media device 100 may attach to the "bottom" of a digital camera. For example, as shown by arrow 108, the trusted media device 100 may be attached to the "bottom" of the digital camera 104. In other embodiments, the trusted media device 100 may attach to a "side" of a digital camera or other. In some embodiments, the trusted media device 100 may be integrated with the digital camera 104, such that components of the trusted media device 100 are disposed in the housing of the digital camera 104.

Figure 2:
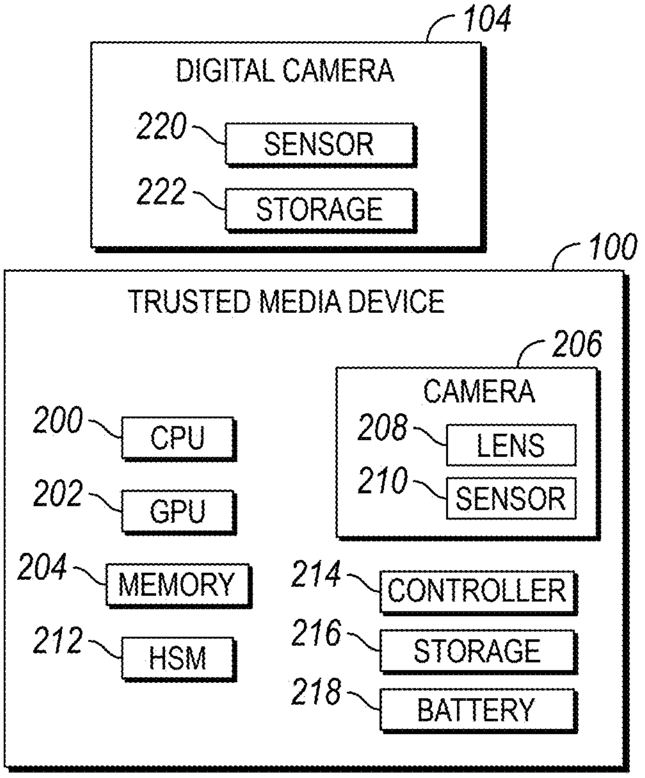
FIG. 2 is a block diagram of the trusted media device of FIG. 1 that may be attached to the digital camera in accordance with an embodiment of the disclosure.

FIG. 2 is a block diagram of the trusted media device 100 and digital camera 104 of FIG. 1 in accordance with an embodiment of the disclosure. The trusted media device 100 may include a processor (e.g., a central processing unit (CPU) 200), and, in some embodiments, a graphics processing unit (GPU) 202. The processor (as used the disclosure, the term "processor" encompasses microprocessors) may include one or more processors having the capability to receive and process data, such as data stored in a memory. In some embodiments, the processor may be a reduced instruction set (RISC) processor. Additionally, the processor may include a single-core processor or multicore processors. In some embodiments, a CPU, GPU, and other components may be implemented as a system on a chip (SoC). In some embodiments, the trusted media device 100 includes a Raspberry Pi single-board computer (SBCs).

The trusted media device 100 also includes a volatile memory 204, digital camera 206 (that is, a lens 208 and image sensor 210 (such as a CCD or CMOS sensor), a hardware security module (HSM) 212, a charger controller 214, non-volatile storage 216, and a battery 218. In other embodiments, the trusted media device 100 may omit some of the components described herein, such as the digital camera 206, the hardware security module (HSM), a USB connector, etc. For example, as discussed above, the trusted media device 100 may be integrated with the digital camera 104 and may thus use components of the digital camera 104 for some of the functionality described herein.

In some embodiments, the hardware security module 212 may be a ZYMKEY hardware security module. The storage 216 may include solid state storage and, in some embodiments, may include removeable storage (e.g., a microSD card). The battery 218 may provide power to the components of the trusted media device 100 and may be rechargeable via an interface of the trusted media device 100 (such as a USB connector as mentioned above). It should be appreciated that the trusted media device 100 may include other components (not shown) for functioning of the device, such as memory interfaces, input/output interfaces and network interfaces.

In some embodiments, the trusted media device 100 includes a universal serial bus (USB) connector. In such embodiments, the trusted media device 100 may connect to the digital camera 104 via the USB connector and a corresponding USB receptable on the digital camera 104. In other embodiments, the trusted media device 100 may wirelessly connect to the digital camera via a suitable wireless protocol or standard, such as Wi-Fi (that is, an IEEE 802.11 standard) or Bluetooth.

In some embodiments, the digital camera 104 may be a single lens reflex (digital SLR or DSLR) camera or digital single-lens mirrorless (DSLM) camera. As shown in FIG. 2, the digital camera 104 may include an image sensor 220 (such as a CCD or CMOS sensor), non-volatile storage 222, as well as several other components omitted for clarity (for example, a lens, a battery, a wireless network interface, and so on). The storage 222 may include solid state storage and, in some embodiments, may include removeable storage (e.g., a microSD card).

The trusted media device 100 may communicate with the digital camera 104 via an application programming interface (API). The API may be provided by a manufacturer of the digital camera 104 and may enable the trusted media device 100 to read and write to the storage 222 of the digital camera 104, as well as obtain specifications and settings of the digital camera 104. In some embodiments, the trusted media device 100 may communicate with the digital camera 104 using an available software library such as gphoto2.

Figure 3:
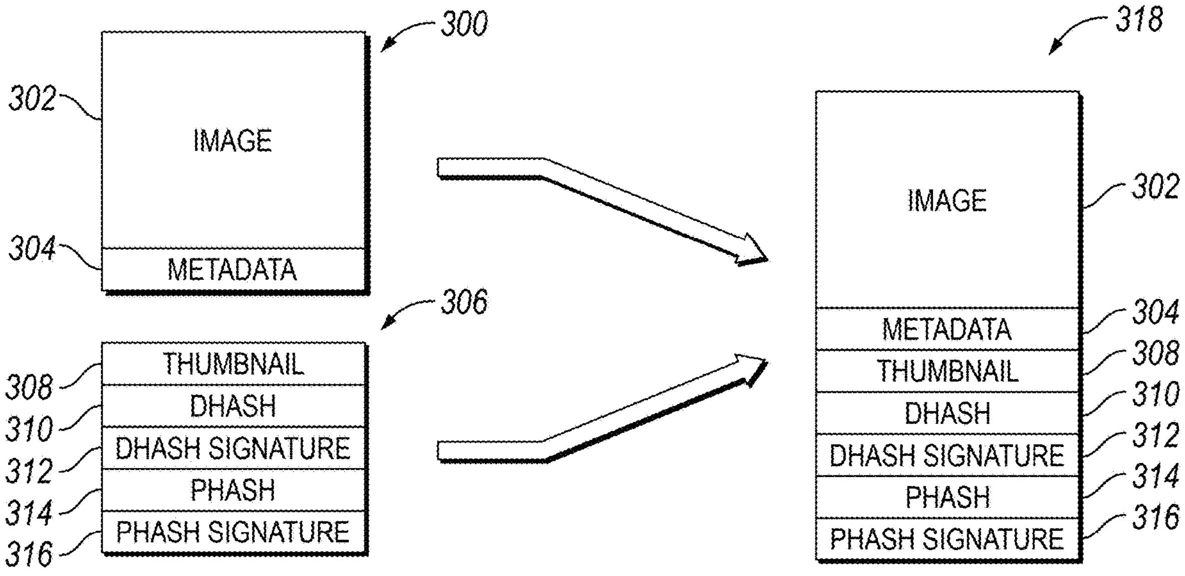
FIG. 3 is a block diagram of an overview of trusted media file generation provided by a trusted media device in accordance with an embodiment of the disclosure.

FIG. 3 depicts an overview of trusted media file generation provided by a trusted media device in accordance with an embodiment of the disclosure. Although the process 300 is described with reference to a digital image, it should be appreciated that other embodiments may instead implement the process 300 for digital video using the techniques described herein. A digital camera may capture a digital image stored as image file 300, which includes the image 302 and metadata 304. The image file 302 may be stored on the digital camera but may, in some embodiments, be stored on the trusted media device. In some embodiments, the image 302 is stored as RAW image format. Additionally or alternatively, the image 302 may be stored in compressed image formats such as JPEG format, PNG format, or other formats. The metadata 304 may include image metadata, digital camera metadata, and other metadata that may typically be associated with the image 302. For example, the metadata 304 may include a device identifier, a time and date when the image was captured, and the location where the image was captured. In some embodiments, the metadata 304 may include exchangeable image file format (EXIF) data.

The trusted media device may generate data 306 to provide trusted media authentication of the image file 300. This data may include a thumbnail 308 of an image captured by the trusted media device, a data hash 310 (referred to as a "dhash"), a data hash signature 312, a perceptual hash 314 (referred to as a "phash"), and a perceptual hash signature 316.

As shown in FIG. 3, the image file 300 from a digital camera and the generated data 306 from a trusted media device may be processed according to techniques described in the disclosure to create a trusted media file 318. The trusted media file 318 includes the image 302, metadata 304, the thumbnail 308, the data hash 310, the data hash signature 312, the perceptual hash 314, and the perceptual hash signature 316. The trusted media file 318 may be used to view the image 302, edit the image 302, etc., while providing an indicator that the image 302 is trustworthy, authenticated as capturing a real-world scene, and is not synthetic media. In some embodiments, the trusted media file 318 may include multiple files corresponding to the format of the image file 300. For example, in some embodiment in which the digital camera stores the image file in RAW format and compressed format (e.g., JPEG), two trusted media files may be created: a trusted media file with the RAW image and a trusted media file with the compressed image. In some embodiments, some components of the trusted media file 318 may be user-selectable such that only the thumbnail 308, data hash 310, and a signature are included. In some embodiments, the trusted media file 318 my only include a single signature for the authentication components (instead of data hash signature, perceptual hash signature, etc.). Additionally, in such embodiments, a trusted media file having the components described herein may be generated on a separate computing device (for example, a personal computer or a cloud computing device) using signature capabilities provided by the separate computing device.

In some embodiments, the trusted media file 318 may be created in addition to the image file 300, such that both the trusted media file 318 and the original image file 300 are available for viewing, editing, or publication after an image capture. In other embodiments, only the trusted media file 318 is created after an image capture and the image file 300 is deleted such it is unavailable for viewing, editing, or publication. In some embodiments, the trusted media file 318 may be stored on the digital camera after creation.

Figure 4:
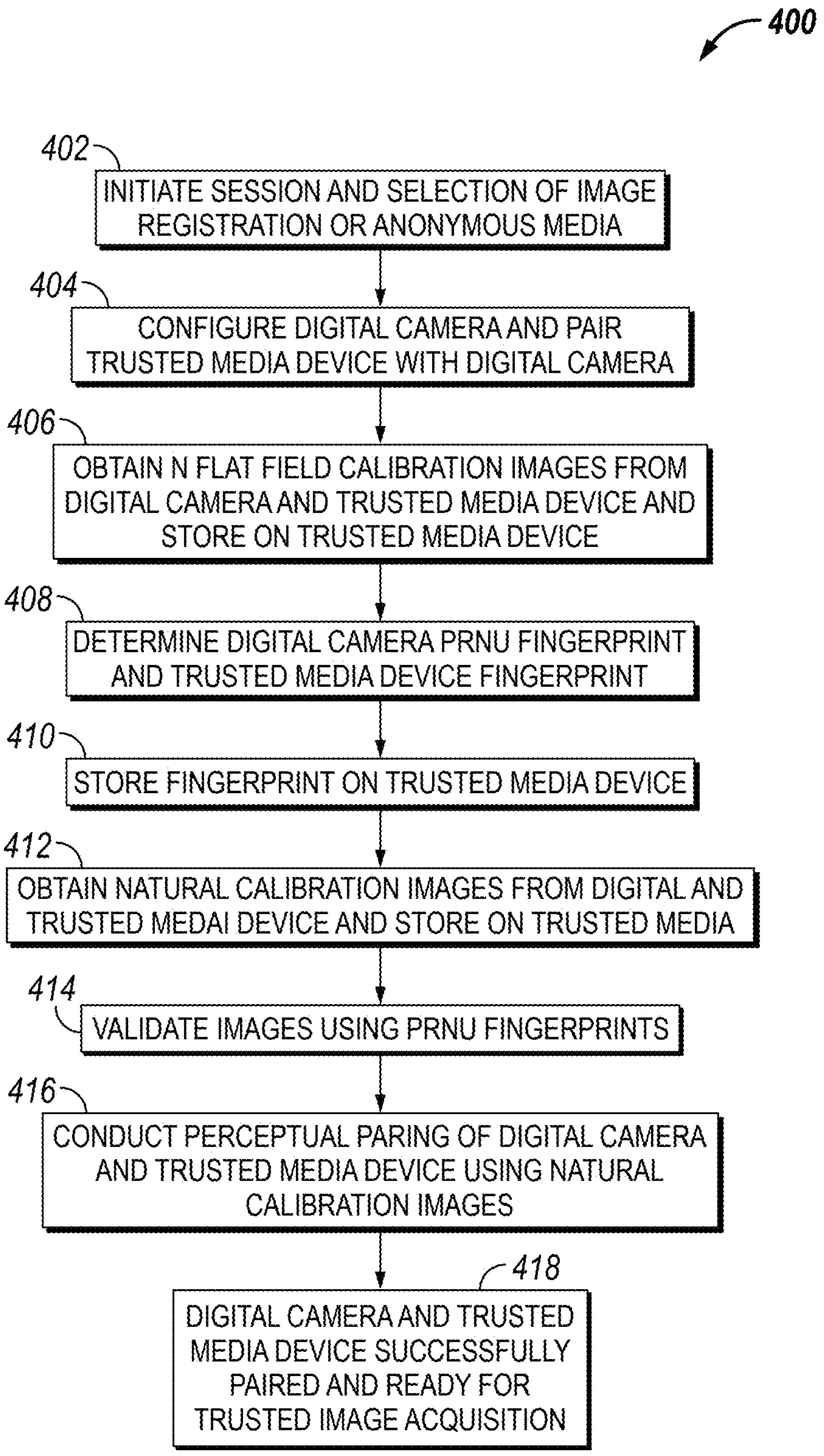
FIG. 4 is a block diagram of a process for pairing and fingerprinting a trusted media device with a digital camera in accordance with an embodiment of the disclosure.

In some embodiments, a trusted media device may provide a pairing and fingerprinting process with an associated digital camera before the trusted media device may be used to authenticate trusted media. FIG. 4 depicts a process 400 for pairing and fingerprinting the trusted media device with a digital camera in accordance with an embodiment of the disclosure. As shown in FIG. 4, a session may be initiated on the trusted media device to register images or create anonymous media (block 402). In some embodiments a user may select to sign a trusted media file with a user identifier or to sign a trusted media file anonymously. In such embodiments, signing may use public/private key technologies known in the art and the Digital Signature Algorithm. In certain embodiments, the trusted media device may include public/private key pairs for use with a trusted media authentication certification. In such embodiments, a user identifier may be associated with a specific public/private key pair stored by the trusted media device. The signature based on the public/private key pair and the user identifier may be used to claim authorship of a trusted media file. In other embodiments, a trusted media file may be created anonymously be omitting use of a user identification and using a generic public/private key stored on the trusted media device and that is not associated with any user identifier.

As shown in FIG. 4, the digital camera may be configured to receive the trusted media device, and the trusted media device may be tangibly attached or wirelessly connected to the digital camera (block 404). The paired digital camera and trusted media device may then be used to capture N number of flat field calibration images which are then stored on the trusted media device (block 406). Next, a fingerprint of the image sensor of the digital camera and a fingerprint of the image sensor of the trusted media device are determined from the flat field calibration images (block 408). The fingerprinting steps described herein may be performed on a RAW image file, on a compressed format (e.g., JPEG, PNG, or the like) image file, or a combination thereof. In some embodiments, the fingerprint is a Photo Response Non-Uniformity (PRNU) fingerprint. As known in the art, a PRNU may take advantage of photoresponsive irregularities unique to individual image sensors. These photoresponsive irregularities are pixel-specific and result in a fixed pattern noise referred as "PRNU." After calibration, a PRNU may be determined from a captured image by denoising the image using techniques known in the art, such as discrete cosine transform (DCT) or wavelet transform denoising, and then subtracting the denoised image from the capture image to obtain a noise signature. The digital camera fingerprint and the trusted media device fingerprint are stored on the trusted media device (block 410).

The paired digital camera and the trusted media device may then be used to capture natural calibration images that are then stored on the trusted media device (block 412). The digital camera fingerprint and the trusted media device fingerprint are validated (block 414) by determining the fingerprints of the calibration images and comparing the fingerprints to the previously determined fingerprints. If the validation is successful, the digital camera and trusted media device are perceptually paired (block 416). In some embodiments, the perceptual pairing include computing a perceptual hash and SIFT keypoints for a calibration image captured by the digital camera and a calibration image captured by the trusted media device. If the perceptual hashes and SIFT keypoints match, the digital camera and trusted media device are perceptually paired. After pairing, the digital camera and trusted media device are ready for trusted media generation (block 418).

Figure 5:
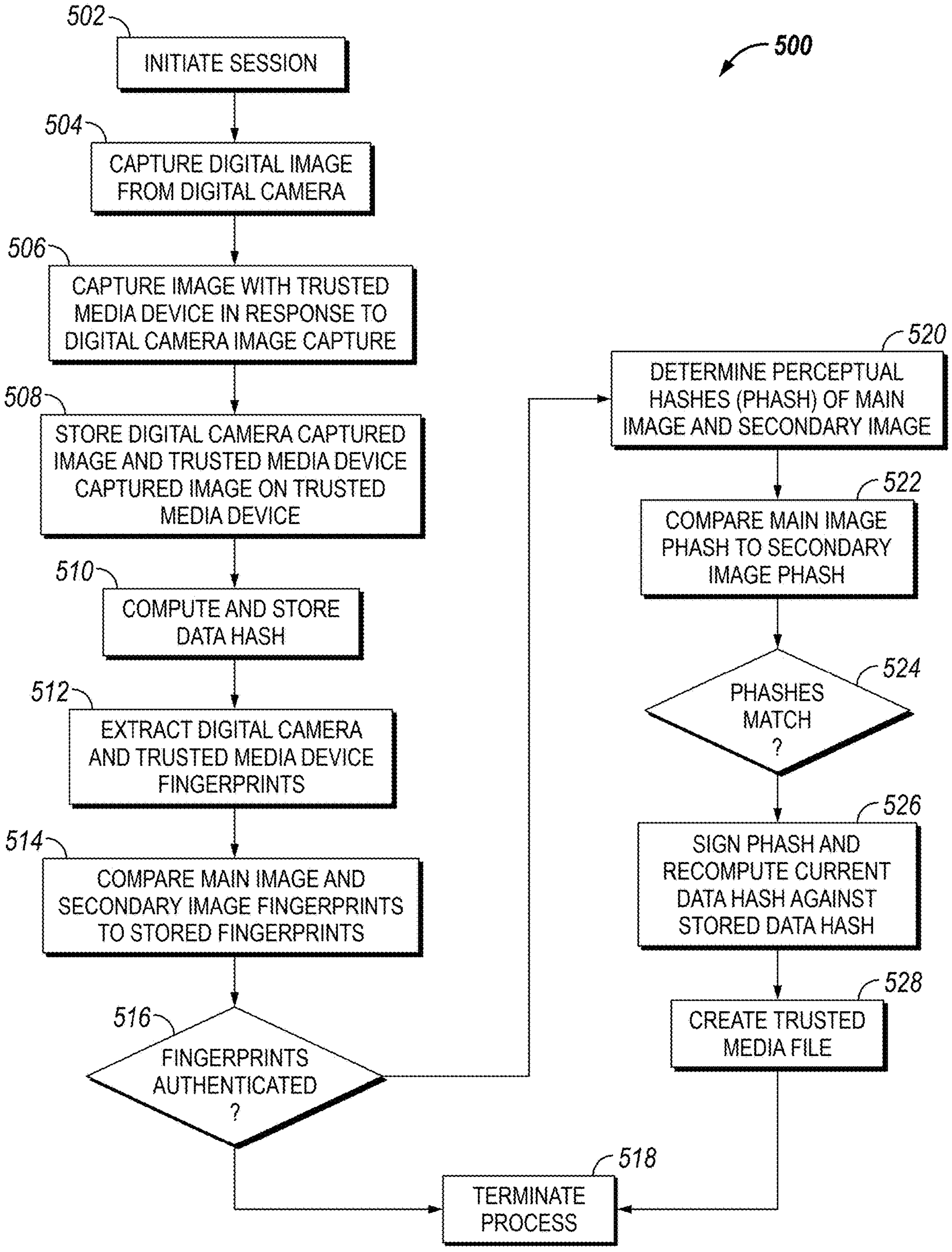
FIG. 5 is a block diagram of a process for capturing and providing a trusted image using a trusted media device for a digital camera in accordance with an embodiment of the disclosure.

A paired digital camera and trusted media device may be used to generate and authenticate trusted media images or video of a real-world scene. In some embodiments, the root of trust sources for authenticating images or video may include a hardware trust (for example, the serial number from the digital camera) in addition to the fingerprint and perceptual hash described in the disclosure. FIG. 5 depicts a process 500 for capturing and providing a trusted image in accordance with an embodiment of the disclosure. Here again, although the process 500 is described with reference to a digital image, it should be appreciated that other embodiments may instead implement the process 500 for digital video using the techniques described herein. Moreover, although FIG. 5 is described with reference to both fingerprint authentication and perceptual hash authentication, it should be appreciated that other embodiments may use only fingerprint authentication or only perceptual hash authentication, alone or in combination with authentication from the hardware root of trust mentioned above. As also discussed above, the process 500 may be used to create an anonymous trusted media file (via a generic public/private key pair stored on the trusted media device and not associated with a user identified) or trusted media file with known authorship (via a specific public/private key pair and associated user identifier).

As shown in FIG. 5, a session may be initiated by ensuing that a digital camera and trusted media device are paired and, if necessary, attaching the trusted media device to the digital camera (block 502). Next, an image (referred to as the "main image") may be captured by the digital camera (block 504). For example, a user may capture an image by selecting a shutter button on the digital camera.

In response to the image capture by the digital camera, the trusted media device may also capture an image (referred to as the "secondary image") (block 506). In some embodiments, for example, the trusted media device may be responsive to the action of an image capture by the digital camera; that is, the image capture by the digital camera may be a triggering event that causes the trusted media device to also capture an image. In other embodiments, the trusted media device may cause the digital camera to capture an image as opposed to responding to the digital camera.

The main image from the digital camera and secondary image from the trusted media device may be stored on the trusted media device (block 508). Next, a data hash may be computed from the secondary image and stored on the trusted media device (block 510). In some embodiments, the data hash may be computed using a Secure Hash Algorithm 2 (SHA 2) function, such as SHA256. The data hash may be signed with a signature generated using a hardware security module of the trusted media device.

Fingerprints suitable for comparison are then extracted from the captured images (block 512), such as by denoising a captured image and subtracting the denoised image from the original image to obtain a noise fingerprint. The extracted main image fingerprint and the extracted secondary image fingerprint are compared to the stored digital camera fingerprint and stored trusted media device fingerprint respectively (block 514) to authenticate the fingerprints (block 516). As discussed above, in some embodiments the extracted fingerprints may be PRNU fingerprints which may be compared to stored PRNU fingerprints for the digital camera and the trusted media device. In some embodiments, comprising of the fingerprints may include a correlation analysis to determine a correlation measure. The correlation measure may be compared to a threshold, such a correlation measure greater than the threshold results in authentication of the fingerprints.

If the fingerprints are not authenticated, the trusted media process stops (block 518). If the fingerprints are authenticated, a perceptual hash of the main image and a perceptual hash of the secondary image are computed (block 520). The perceptual hash of an image may use one perceptual hash function or a combination of perceptual hash functions. In some embodiments, the perceptual hash may be a combination of a discrete cosine transform (DCT) hash and one or more scale-invariant feature transform (SIFT) hashes. In such embodiments, the scale-invariant feature transform (SIFT) hashes may include a first SIFT hash trained using publicly available training data sets for photo manipulations and a second SIFT hash similar to the first SIFT hash but having crowdsourced keypoint extraction parameters.

The perceptual hash of the main image may be compared to the perceptual hash of the secondary image (block 522) to determine if the perceptual hashes match (block 524). The comparison may include comparing a string value of a perceptual hash to a string value of another perceptual hash.

In some embodiments, a geometric transformation of the digital image and the secondary image may be computed and compared to authenticate images. In such embodiments, the geometric transformation computation and comparison may be used in addition to or as an alternative to the perceptual hash comparison. The geometric transformation may be computer based on a known distance between the digital camera and the digital camera of the image authentication device. In such embodiments, the geometric relationship between the perspective from one image and the perspective of the second image is calculated and authenticated based on the known geometric relationship (e.g., distance) between the two cameras used to capture the images. In some embodiments, the geometric transformation may be performed using scale-invariant feature transform (SIFT) points.

If the perceptual hashes do not match, the process stops (block 518). If the perceptual hashes match, the perceptual hash of the secondary image is signed, and the data hash of the secondary image is recomputed and compared against the stored hash (block 526). In some embodiments, the perceptual hash computations and comparisons may be performed in parallel, in series (before or after) the data hash computation and comparison. For example, in some embodiments the data hash may be computed first, then the perceptual hash computing and comparison (e.g., involving SIFT determinations) may be performed, after which a comparison of the data hash against the stored data hash may be performed. In such embodiments, the data hash may be recomputed as described (block 526).

The trusted media file is then created (block 528) and stored on the digital camera. As discussed herein and as shown in FIG. 3, the trusted media file may include the image (e.g., a RAW image), metadata, the thumbnail of the image, the data hash of the image, the data hash signature, the perceptual hash of the image, and the perceptual hash signature. In some embodiments, the secondary digital image may be deleted from the trusted media device after the trusted media file is created. As also mentioned above, in some embodiments multiple trusted media files may be created that each correspond to a respective image file format captured by the digital camera (e.g., one trusted media file with a RAW image and one trusted media file with a compressed image).

Figure 6:
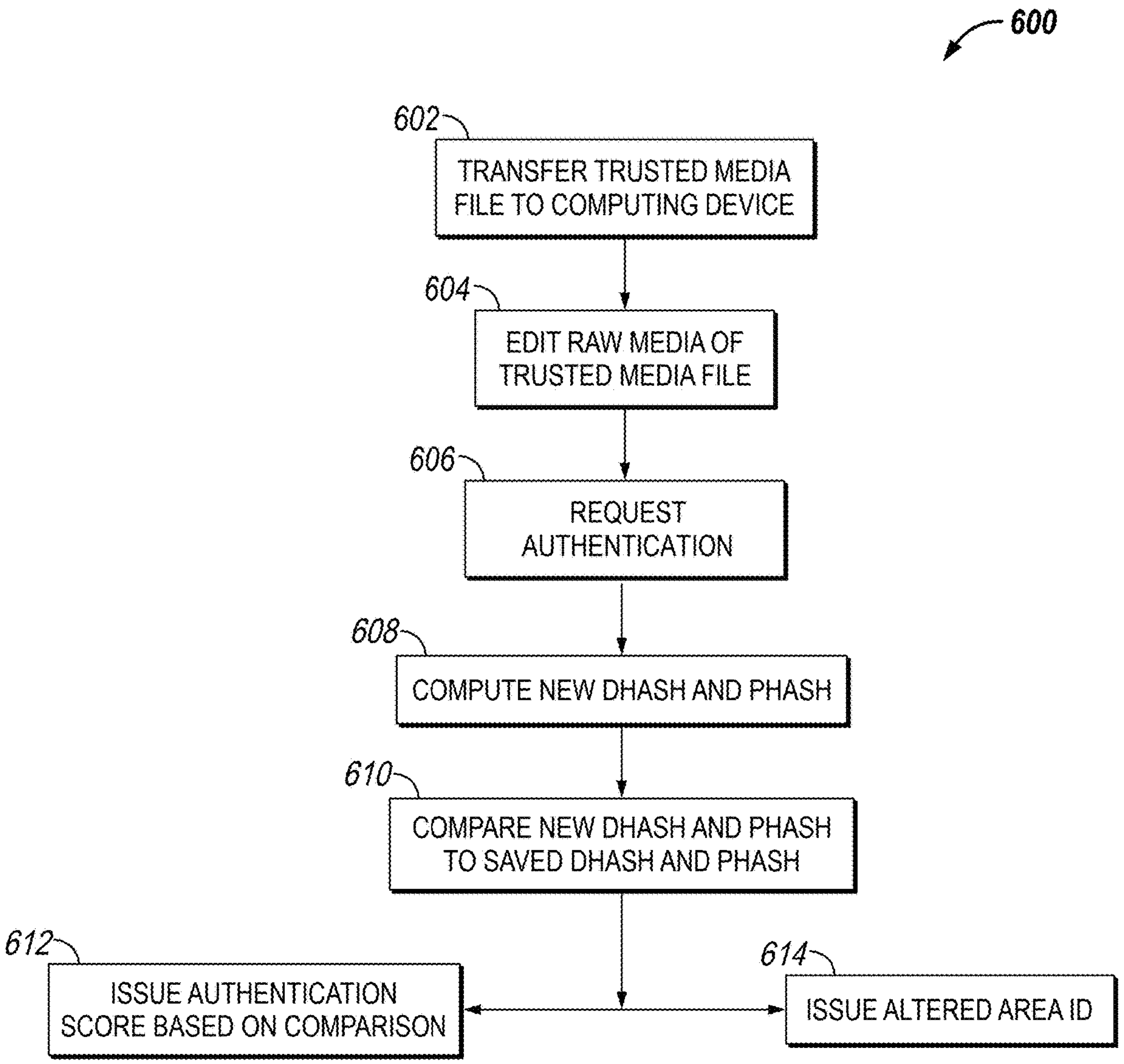
FIG. 6 is a block diagram of a process for viewing and editing trusted images created using a trusted media device for a digital camera in accordance with an embodiment of the disclosure.

Embodiments of the disclosure also include authentication of trusted images for viewing and editing. FIG. 6 depicts a process 600 for viewing and editing trusted images created using the trusted media device in accordance with an embodiment of the disclosure. Initially, a trusted media file may be transferred to a computing device (block 602). The computing device may be, for example, a desktop computer, a laptop computer, a tablet computer, a smartphone. In some embodiments, the computing device may include or be a part of a cloud computing system, a server, or a virtual server. The RAW image of the trusted media file may be edited on the computing device by a user (block 604), such as by using an image editing program. Such editing may include cropping, scaling, inpainting, color change, adding special effects, adjusting brightness, contrast, or color, other editing, or any combination thereof.

In some embodiments, the computing device may request authentication of the trusted media file (block 606). In some embodiments, the authentication may be requested via a software development kit (SDK) that provide APIs or other interfaces for authenticating trusted media files created in accordance with embodiments of the disclosure. In other embodiments, the trusted media file may be authenticated via a request to a server that provides authentication.

After a request for authentication, a new data hash and new perceptual hash may be computed based on the edited image (block 608). In some embodiments, the data hash may be computed using a Secure Hash Algorithm 2 (SHA 2) function, such as SHA256. In some embodiments, the perceptual hash may be a combination of a discrete cosine transform (DCT) hash and one or more scale-invariant feature transform (SIFT) hashes, such as the first SIFT hash and second SIFT hash discussed above.

The new data hash and the new perceptual hash are then compared to the stored data hash and the stored perceptual hash from the original trusted media file (block 610). In some embodiments, the comparison may be used to determine an authentication score (block 612). For example, the difference between a new hash and a stored hash may be quantified (e.g., based on a number or percentage of different characters) and used to calculate an authentication score. In some embodiments, the authentication core may be numeric or binary pass/fail score based on comparison to a threshold.

In some embodiments, the comparison may be used to determine an identification of an altered area of the image (block 614). In some embodiments, the identification is performed by comparing SIFT keypoints.

Embodiments of the disclosure, such as aspects of the processes 400, 500, and 600, may be implemented as executable code stored on a computer-readable media and executed by a processor (for example, CPU 200). The executable code is in the form of a set of instructions that cause the processor to receive input data and provide outputs based on processing the input data according to the embodiments of the disclosure. For example, the instructions of the executable code may cause the processor to receive a digital image, determine and compare hashes such as data hash and a perceptual hash, sign hashes using a hardware security module, and output a trusted media file.

Further modifications and alternative embodiments of various aspects of the disclosure will be apparent to those skilled in the art in view of this description. Accordingly, this description is to be construed as illustrative only and is for the purpose of teaching those skilled in the art the general manner of carrying out the embodiments described in the disclosure. It is to be understood that the forms shown and described in the disclosure are to be taken as examples of embodiments. Elements and materials may be substituted for those illustrated and described in the disclosure, parts and processes may be reversed or omitted, and certain features may be utilized independently, all as would be apparent to one skilled in the art after having the benefit of this description. Changes may be made in the elements described in the disclosure without departing from the spirit and scope of the disclosure as described in the following claims. Headings used in the disclosure are for organizational purposes only and are not meant to be used to limit the scope of the description.

What is claimed is:

1. A trusted media device for a digital camera, comprising:

a housing, wherein the housing comprises a portion configured to insert into a corresponding receptable of the digital camera a processor disposed within the housing;

an image sensor disposed within the housing and accessible by the processor;

a hardware security module disposed within the housing and accessible by the processor; and computer-readable media disposed within the housing and accessible by the processor, the computer-readable media having executable code stored thereon, the executable code comprising a set of instructions that causes the processor to generate a trusted image file based on a digital image captured by the digital camera, wherein the set of instructions cause the processor to perform operations comprising:

conducting a fingerprint authentication, comprising:

determining that a first fingerprint of the digital image matches a stored fingerprint associated with the digital camera, wherein the stored fingerprint associated with the digital camera comprises a Photo Response Non-Uniformity (PRNU) fingerprint associated with an image sensor of the digital camera; and determining that a second fingerprint of a second image matches a stored fingerprint associated with the trusted media device.

2. The trusted media device of claim 1, wherein the set of instructions cause the processor to perform operations comprising:

obtaining the digital image from the digital camera, the digital image stored as an image file comprising the digital image and metadata;

obtaining the second image from the trusted media device;

computing a data hash of the second image;

computing, in response to the fingerprint authentication, a first perceptual hash of the digital image;

computing, in response to the fingerprint authentication, a second perceptual hash of the second image;

determining that the first perceptual hash matches the second perceptual hash; and creating, in response to determining that the first perceptual hash matches the second perceptual hash, the trusted image file, the trusted image file comprising the digital image, the metadata, the data hash, the second perceptual hash, and a signature.

3. The trusted media device of claim 2, wherein the data hash uses a SHA256 hash.

4. The trusted media device of claim 2, wherein the first perceptual hash and the second perceptual hash each use scale-invariant feature transform (SIFT).

5. The trusted media device of claim 1, wherein the digital image is stored in RAW image format.

6. The trusted media device of claim 1, wherein the stored fingerprint associated with the trusted media device comprises a Photo Response Non-Uniformity (PRNU) fingerprint associated with the image sensor of the trusted media device.

7. The trusted media device of claim 1, comprising a universal serial bus (USB) connector.

8. The trusted media device of claim 1, comprising a battery.

9. A method for created a trusted image file using a trusted media device for a digital camera, comprising:

obtaining a first image from the digital camera, the first image stored as an image file comprising the first image and metadata;

obtaining a second image from the trusted media device;

computing a data hash of the second image;

conducting a fingerprint authentication, comprising:

determining that a first fingerprint of the first image matches a stored fingerprint associated with the digital camera; and determining that a second fingerprint of the digital image matches a stored fingerprint associated with the trusted media device;

comparing, in response to the fingerprint authentication, a first identifier associated with the first image with a second identifier associated with the second image;

determining that the first identifier matches the second identifier; and creating, in response to determining that the first identifier matches the second perceptual hash, a trusted image file, the trusted image file comprising the digital image, the metadata, the data hash, and a signature.

10. The method of claim 9, wherein comparing, in response to the fingerprint authentication, a first identifier associated with the first image with a second identifier associated with the second image comprises:

computing a first perceptual hash of the first image; and computing a second perceptual hash of the second image.

11. The method of claim 10, wherein determining that the first identifier matches the second identifier comprises determining that the first perceptual hash matches the second perceptual hash.

12. The method of claim 10, wherein the perceptual has comprises a combination of a discrete cosine transform (DCT) hash and a scale-invariant feature transform (SIFT) hash.

13. The method of claim 12, wherein SIFT hash comprises a first SIFT hash trained using publicly available training data sets and a second SIFT comprising crowd-sourced keypoint extraction parameters.

14. The method of claim 9, wherein comparing, in response to the fingerprint authentication, a first identifier associated with the first image with a second identifier associated with the second image comprises:

computing a first geometric transform of the first image; and computing a second geometric transform of the second image.

15. The method of claim 14, wherein determining that the first identifier matches the second identifier comprises determining that the first geometric transform matches the second geometric transform.

16. The method of claim 14, wherein the first geometric transform and the second geometric transform are performed using scale-invariant feature transform (SIFT) points.

17. A method for created a trusted image file using a trusted media device for a digital camera, comprising:

obtaining a first image from the digital camera, the first image stored as an image file comprising the first image and metadata;

obtaining a second image from the trusted media device;

computing a data hash of the second image;

determining a first noise fingerprint from the first image by denoising the first image and subtracting the denoised first image from the first image to obtain a first fingerprint;

determining a second fingerprint from the second image by denoising the second image and subtracting the denoised second image from the second image to obtain a second fingerprint;

conducting a fingerprint authentication, comprising:

determining that the first fingerprint matches a stored fingerprint associated with the digital camera; and determining that the second fingerprint matches a stored fingerprint associated with the trusted media device;

determining that a first identifier associated with the first image matches a second identifier associated with the second image; and creating, in response to determining that the first identifier matches the second identifier, a trusted image file, the trusted image file comprising the digital image, the metadata, the data hash, and a signature.

18. The method of claim 17, wherein the stored fingerprint associated with the digital camera comprises a Photo Response Non-Uniformity (PRNU) fingerprint associated with an image sensor of the digital camera.

19. The method of claim 17, wherein the stored fingerprint associated with the trusted media device comprises a Photo Response Non-Uniformity (PRNU) fingerprint associated with an image sensor of the trusted media device.

* * * * *